(12) United States Patent
Gong (10) Patent No.: US 12,407,201 B2
(45) Date of Patent: Sep. 2, 2025

(54) ROTOR FOR AN ELECTRIC MACHINE

(71) Applicant: GM GLOBAL TECHNOLOGY OPERATIONS LLC, Detroit, MI (US)

(72) Inventor: Cheng Gong, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 623 days.

(21) Appl. No.: 17/578,534

(22) Filed: Jan. 19, 2022

(65) Prior Publication Data

US 2023/0231428 A1     Jul. 20, 2023

(51) Int. Cl.
*H02K 1/276*     (2022.01)
*H02K 5/16*      (2006.01)
*H02K 15/03*     (2025.01)

(52) U.S. Cl.
CPC .............. *H02K 1/276* (2013.01); *H02K 5/16* (2013.01); *H02K 15/03* (2013.01)

(58) Field of Classification Search
CPC ...... H02K 1/2766; H02K 15/03; H02K 1/276; H02K 5/16; H02K 2213/03
USPC ..................................................... 310/156.01
See application file for complete search history.

(56) References Cited

U.S. PATENT DOCUMENTS

| | | | | |
|---|---|---|---|---|
| 8,957,560 B2* | 2/2015 | Uchiyama | ............ | H02K 1/2766 310/156.56 |
| 9,065,314 B2* | 6/2015 | Arimatsu | ............... | H02K 1/276 |
| 9,293,954 B2* | 3/2016 | Kawasaki | ............... | H02K 1/276 |
| 9,312,731 B2* | 4/2016 | Takahashi | ............ | H02K 1/2706 |
| 10,211,689 B2* | 2/2019 | Liang | .................... | H02K 1/2766 |
| 10,879,775 B2* | 12/2020 | Zhu | ......................... | B32B 38/04 |
| 2008/0007131 A1* | 1/2008 | Cai | ....................... | H02K 1/2766 310/156.01 |
| 2008/0258573 A1* | 10/2008 | Kamiya | ................. | H02K 7/006 180/65.23 |
| 2012/0223607 A1* | 9/2012 | Uchiyama | ............ | H02K 1/2766 310/156.08 |
| 2014/0077650 A1* | 3/2014 | Takahashi | ............ | H02K 1/2706 310/156.11 |
| 2017/0264152 A1* | 9/2017 | Liang | .................... | H02K 1/2706 |
| 2019/0363618 A1* | 11/2019 | Zhu | ........................ | H02K 15/02 |
| 2019/0363619 A1* | 11/2019 | Zhu | ........................ | H02K 1/2706 |
| 2020/0112210 A1* | 4/2020 | Zhu | ....................... | H02K 1/2766 |

FOREIGN PATENT DOCUMENTS

JP           2014064471 A  *  4/2014  .......... H02K 1/2766

* cited by examiner

*Primary Examiner* — Alex W Mok
(74) *Attorney, Agent, or Firm* — Quinn IP Law (57) ABSTRACT

An interior permanent magnet (IPM) electric machine has an improved rotor configuration to manage mechanical stresses induced by electro-magnetic force acting upon permanent magnets housed therein. This includes providing magnet cavities in the rotor with sufficient clearances in the corners wherein a portion of a slot corner is formed with certain curvature shapes using a novel geometry. By doing this, more surface area is obtained to evenly distribute stress that is induced by centrifugal force acting upon the rotor during rotation, thus reducing the stress concentration. Furthermore, an expanded space is achieved between the magnet corner and the rotor lamination, thus providing robust packaging and dynamic support of the permanent magnets in the magnet cavities. Furthermore, the expanded space provides improved clearance for ease of manufacturing and assembly.

17 Claims, 4 Drawing Sheets

ROTOR FOR AN ELECTRIC MACHINE

INTRODUCTION

Rotary electric machines, such as motor-generator units, include a rotor configured to rotate about a shaft defining an axis, and a stator. One type of the rotary electric machine is an interior permanent magnet (IPM) electric machine, wherein the rotor includes a plurality of permanent magnets that are arranged in longitudinal slots that are formed near its outer periphery. The plurality of permanent magnets interact with rotating magnetic fields generated by the stator to induce torque on the shaft of the rotor to urge its rotation.

During rotation, a rotor experiences mechanical stress as electro-magnetic force generated via a stator acts upon the plurality of permanent magnets to generate torque that is transferred to the rotor shaft, with the mechanical stress being caused by centrifugal force of the permanent magnets in the longitudinal slots of the rotor. The dynamic speed and torque operating ranges of the electric machine may be limited based upon the mechanical stresses.

However, engineers seek to design electric motors that are capable of higher speed operation to increase power density and reduce the size of the motor. As motor speed increased, it has been found that known fillet designs in magnet slot corners that worked well at medium to low speeds actually limit ability to achieve very high-speed operation due to stress concentration that is induced by centrifugal force.

Known designs for reducing stress concentration at the magnet slot corners include use of fillets by adding (or not removing) inside corner material towards the magnet, with larger corner radii being preferred to achieve improved stress reduction. However, for motors at very high speeds, target stress values are more difficult to achieve due to space limitations, and may result in a smaller clearance between the magnet and the rotor. This may lead to issues during manufacturing and assembly, including part-to-part variability, tolerances, etc.

There is a need for an improved rotor configuration for an IPM electric machine to better manage mechanical stresses caused by the centrifugal force of the permanent magnets acting upon the rotor. There is also need for an improved rotor configuration to provide improved robustness of a rotor for an IPM electric machine, including robustness to placement of permanent magnets within longitudinal slots that are formed in the rotor. There is also need for improved manufacturability of a rotor, including an improved ability to insert permanent magnets within longitudinal cavities that are formed in the rotor.

SUMMARY

The concepts described herein provide an interior permanent magnet (IPM) electric machine having an improved rotor configuration to better manage mechanical stresses induced by the electro-magnetic force acting upon the permanent magnets housed therein. This includes providing magnet cavities in the rotor with sufficient clearances in the corners wherein a portion of a slot corner is formed with certain curvature shapes using a novel geometry. By doing this, more surface area is obtained to evenly distribute stress that is induced by centrifugal force at high-speed rotation, thus reducing the stress concentration. Furthermore, an expanded space is achieved between the magnet corner and the rotor lamination, thus providing robust packaging and dynamic support of the permanent magnets in the magnet cavities. Furthermore, the expanded space provides improved clearance for ease of manufacturing and assembly.

An aspect of the disclosure includes a laminate plate for a rotor of an interior permanent magnet electric machine. The laminate plate is a disk-shaped plate having a plurality of elongated apertures, wherein each of the elongated apertures has opposed first and second sides, and opposed first and second ends. The first end is disposed towards an axis of rotation of the disk-shaped plate, and the second end is disposed towards an outer periphery of the disk-shaped plate. The second end includes a corner portion and a load bearing portion, wherein the load bearing portion is arranged perpendicular to the first side. The corner portion has an edge that defines a void area that is recessed into the first side. The edge has a non-linear geometry that includes a convex portion arranged in series with a concave portion, wherein the convex portion is connected to the first side and the concave portion is connected to the load bearing portion of the second end. The edge minimizes a stress concentration in the corner portion that may be induced by centrifugal force of an element such as a permanent magnet that is disposed in the elongated aperture and is acting upon the load bearing portion when the rotor is rotating in the IPM electric machine.

Another aspect of the disclosure includes the convex portion of the edge of the corner portion having a first axis of rotation R1 and the concave portion having a second axis of rotation R2, wherein the first axis of rotation R1 is greater than the second axis of rotation R2.

Another aspect of the disclosure includes the convex portion of the edge of the corner portion having a first axis of rotation R1 and the concave portion having a second axis of rotation R2, wherein the first axis of rotation R1 is less than 2 mm, and wherein the second axis of rotation R2 is greater than 0.05 mm.

Another aspect of the disclosure includes the edge of the corner portion being a complex spline curve having maximum depth into the plate that is less than 2 mm.

Another aspect of the disclosure includes the edge minimizing the stress concentration in the corner portion that is induced by centrifugal force of the element that is disposed in the aperture when the rotor is rotating in the IPM electric machine, wherein the element is arranged to act upon the load bearing portion.

Another aspect of the disclosure includes the laminate plate being fabricated from electrical steel.

Another aspect of the disclosure includes the plurality of apertures being circumferentially arranged.

Another aspect of the disclosure includes the plurality of laminations being disk-shaped laminations that are disposed on the rotatable shaft in a longitudinally-stacked arrangement, wherein each of the laminations includes a plurality of apertures, wherein the laminations are arranged on the rotatable shaft such that the apertures are aligned to form the axially-disposed cavities.

Another aspect of the disclosure includes a rotor for an interior permanent magnet (IPM) electric machine that includes a rotatable shaft disposed on a longitudinal axis, a plurality of disk-shaped plates arranged on the rotatable shaft, and a plurality of permanent magnets. Each of the plurality of disk-shaped plates defines a plurality of apertures. The plurality of disk-shaped plates are arranged with the plurality of apertures being aligned to form a plurality of axially-disposed cavities, and the plurality of permanent magnets are disposed in the plurality of axially-disposed cavities. Each of the apertures of the plurality of disk-shaped plates has opposed first and second sides, and opposed first and second ends, wherein the first end is disposed towards the longitudinal axis, and wherein the second end is disposed towards an outer periphery of the disk-shaped plate. The second end includes a corner portion and a load bearing portion, and the load bearing portion is arranged perpendicular to the first side. The corner portion has an edge that defines a void area that is recessed into the first side, wherein the edge includes a convex portion arranged in series with a concave portion. The convex portion is connected to the first side, and the concave portion is connected to the load bearing portion of the second end. The edge minimizes a stress concentration in the corner portion that is induced by centrifugal force of a respective one of the permanent magnets that is disposed in the aperture when the rotor is rotating.

Another aspect of the disclosure includes an interior permanent magnet (IPM) electric machine that includes a rotor that is rotatably arranged within a stator. The rotor includes a rotatable shaft, disposed on a longitudinal axis, a plurality of laminate plates arranged on the rotatable shaft, and a plurality of permanent magnets. Each of the plurality of laminate plates defines a plurality of apertures. The plurality of disk-shaped plates are arranged with the plurality of apertures being aligned to form a plurality of axially-disposed cavities, and the plurality of permanent magnets are disposed in the plurality of axially-disposed cavities. Each of the apertures of the plurality of disk-shaped plates has opposed first and second sides, and opposed first and second ends, wherein the first end is disposed towards the longitudinal axis, and wherein the second end is disposed towards an outer periphery of the disk-shaped plate. The second end includes a corner portion and a load bearing portion, and the load bearing portion is arranged perpendicular to the first side. The corner portion has an edge that defines a void area that is recessed into the first side, wherein the edge includes a convex portion arranged in series with a concave portion. The convex portion is connected to the first side, and the concave portion is connected to the load bearing portion of the second end. The edge minimizes a stress concentration in the corner portion that is induced by centrifugal force of a respective one of the permanent magnets that is disposed in the aperture when the rotor is rotating in the stator.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
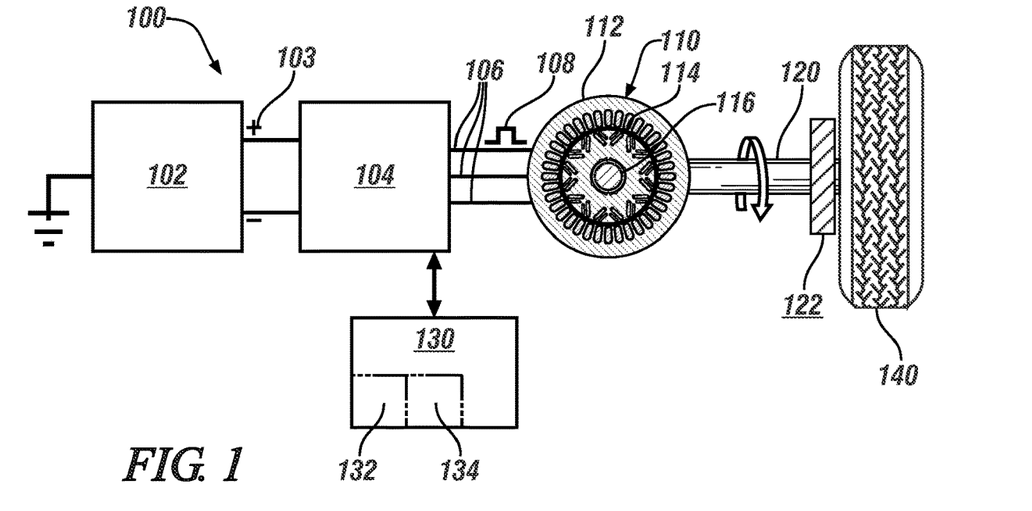
FIG. 1 schematically illustrates a system that includes a multi-phase rotary interior permanent magnet (IPM) electric machine ("electric machine") that is arranged to generate and transfer torque to an actuator to effect work, in accordance with the disclosure.

Referring to the drawings, wherein like reference numbers refer to the same or like components in the several Figures, FIG. 1 schematically illustrates a system 100 that includes an electric machine 110 that is arranged to generate and transfer torque to an actuator 140 to effect work, and a controller 130 to control and manage operation thereof. In one embodiment, the system 100 is disposed on a vehicle (not shown). When disposed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The electric machine 110 may be configured as an electric motor that is capable of transforming electric power to mechanical torque, a generator that is capable of transforming mechanical torque to electric power, or as a motor/generator that is capable of both.

The system 100 also includes an inverter 104 and a DC power source 102. The DC power source 102 connects to the inverter 104 via a high-voltage DC bus 103, and the inverter 104 connects to the electric machine 110 via a plurality of electrical power lines 106.

The electric machine 110 is configured as a multi-phase rotary interior permanent magnet (IPM) electric machine ("electric machine") 110 having a stator 112 and a rotor 114, wherein the rotor 114 is arranged on a rotor shaft 116 and is coaxial with and rotatable within the stator 112.

The inverter 104 includes a plurality of semiconductor switches (not shown) that are arranged and controllable to transform DC electric power to AC electric power, and transform AC electric power to DC electric power, employing a pulse-width modulation signal 108 or another control technique. The inverter 104 is arranged and controllable to transform DC electric power originating from the DC power source 102 to AC electric power to actuate the stator 112 of the electric machine 110 to urge the rotor 114 to rotate and generate mechanical torque that is transferred via a rotatable member 120 and a geartrain 122 to the actuator 140 when operating in a torque generating mode. The electric machine 110 is controllable to generate AC electric power from mechanical torque originating at the actuator 140, which is transformed by the inverter 104 to DC electric power for storage in the DC power source 102 when operating in an electric power generating mode. The actuator 140 includes, in one embodiment, a vehicle wheel that transfers torque to a ground surface to effect forward motion as part of a traction propulsion system. The DC power source 102 may be in the form of a rechargeable electrochemical battery device, a fuel cell, an ultracapacitor, and/or another battery technology.

Sensors are arranged to monitor parameters of the system 100. Monitored parameters include, by way of non-limiting examples, voltage and current between the electric machine 110 and the inverter 104, and rotational speed of the electric machine 110. Other monitored parameters may include, e.g., voltage at the high-voltage DC bus 103, etc. Other monitored parameters may include motor commands, including a motor torque command, which may originate from an operator torque request or a system request associated with the actuator 140.

The controller 130 may be embodied as one or more digital computing devices, and may include one or more processors 134 and sufficient amounts of tangible non-transitory memory 132. A control routine may be stored as an executable instruction set in the memory 132 and executed by one of the processors 134 of the controller 130. The controller 130 is in communication with the inverter 104 and the aforementioned sensors to control operation thereof in response to execution of the control routine to operate the electric machine 110.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.).

Figure 2:
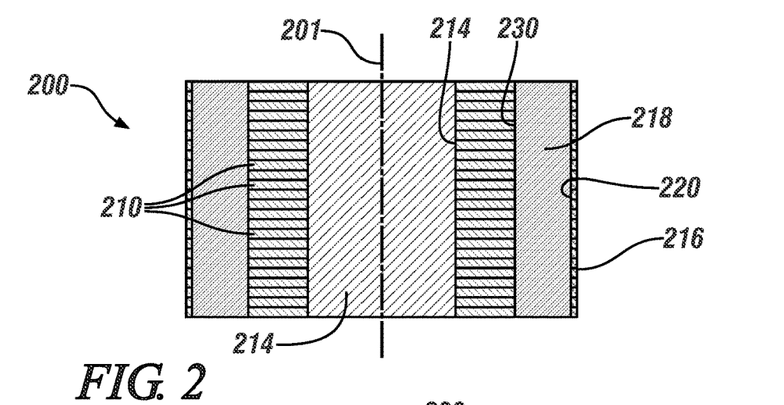
FIG. 2 schematically shows a cutaway side-view of a stack of laminate plates for a rotor of an IPM electric machine, in accordance with the disclosure.
Figure 3:
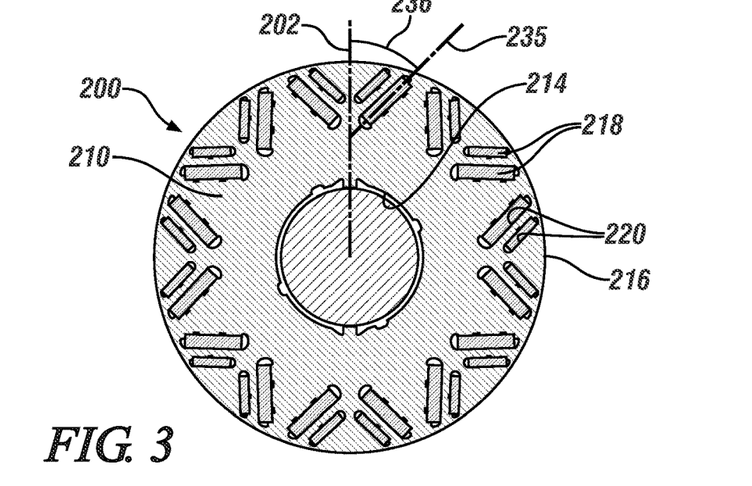
FIG. 3 schematically shows an end-view a laminate plate for a rotor of an IPM electric machine, in accordance with the disclosure.

FIGS. 2 and 3 schematically illustrate a side-view and an end-view, respectively, of a laminate stack 200 for an embodiment of the rotor 114 of the IPM electric machine 110 that is described with reference to FIG. 1.

FIG. 2 schematically shows a cutaway side-view of the laminate stack 200, which is composed of a plurality of laminate plates 210 that may be arranged as elements that are mounted on an embodiment of the rotor shaft 116 of the rotor 114 that is described with reference to FIG. 1. FIG. 2B schematically shows a corresponding end-view one of the laminate plates 210. A rotor longitudinal axis 201 and a radial axis 202 are defined by the laminate plate 210. The rotor longitudinal axis 201 defines an axis of rotation of the rotor 114 and rotor shaft 116.

Each of the laminate plates 210 is arranged as a circular disk that has an inner or center aperture 214 and outer periphery 216. Each of the laminate plates 210 has a plurality of elongated apertures 230 that are circumferentially arranged and formed therein. When a plurality of the laminate plates 210 are arranged in a stack, as shown with reference to FIG. 2, the plurality of elongated apertures 230 are radially aligned to form a plurality of cavities 220 that are parallel with the rotor longitudinal axis 201. Permanent magnets 218 are inserted into and secured in the plurality of axially-disposed cavities 220. Each of the elongated apertures 230 defines a longitudinal aperture axis 235.

As shown, the plurality of elongated apertures 230 are arranged in aperture sets. Aperture longitudinal axes 235 of the elongated apertures 230 are placed at angles 236 in relation to radial axes 202 that are symmetrical about a respective one of the axes 202. As shown, there are eight sets of the elongated apertures 230.

Each of the laminate plates 210 is formed from a ferromagnetic material, e.g., electrical steel, which is an iron alloy tailored to produce specific magnetic properties that may include a small hysteresis area resulting in low power loss per cycle, low core loss, and high permeability. Electrical steel is an iron alloy which may have from zero to 6.5% silicon (Si:5Fe). Commercial alloys may have silicon content up to 3.2%. Manganese and aluminum can be up to 0.5%. In one embodiment, the electrical steel is a grain-oriented electrical steel.

Referring now to FIG. 3 with continued reference to the IPM electric machine 110 of FIG. 1, a plate section 211 of an embodiment of the laminate plate 210 for the rotor 114 is described. The plate section 211 is arranged between center aperture 214 and outer periphery 216, and includes a subset of a set 225 of the elongated apertures 230. The plate section 211 defines a first elongated aperture 230 that is arranged in parallel with a second elongated aperture 229, wherein both define a longitudinal aperture axis 235, and both are placed such that their respective longitudinal aperture axis 235 is at an acute angle 236 in relation to radial axis 202.

In one embodiment, each of the first elongated apertures 230 is configured to accommodate a portion of one of the permanent magnets 218, which may be arranged as a rectangular prism having a rectangular cross-section.

The first elongated aperture 230 has a first side 231 that is opposed to a second side 232, with a first end 233 opposed to a second end 234. The first end 233 is disposed towards the axis of rotation of the laminate plate 210, i.e., rotor longitudinal axis 201, and the second end 234 is disposed towards the outer periphery 216. The second end 234 includes a corner portion 240 and a load bearing portion 245. The load bearing portion 245 is arranged perpendicular to the first side 231 (and to the second side 232 in one embodiment and as shown).

Figures 3A, 3B, 3C:
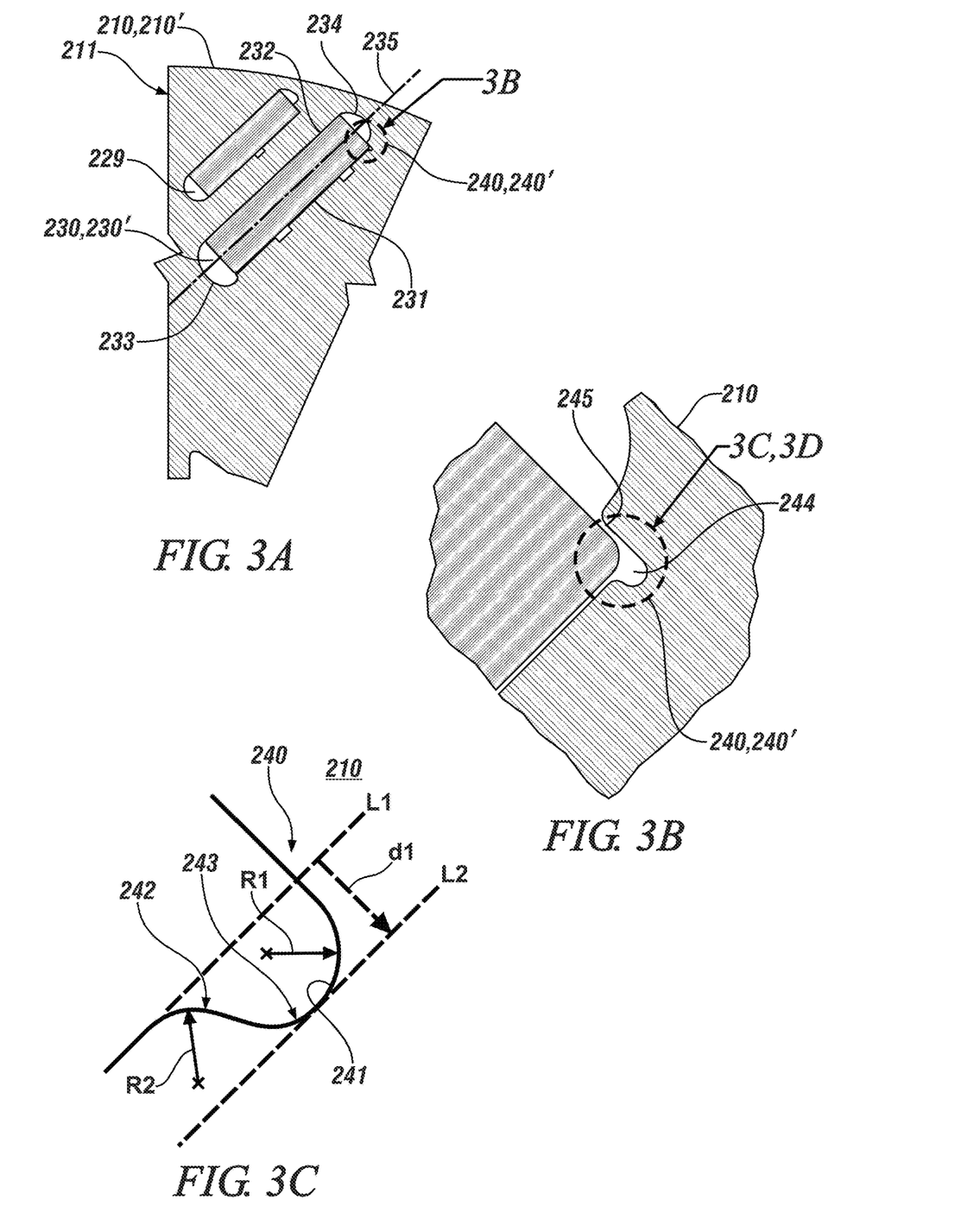
FIGS. 3A, 3B, 3C, and 3D schematically show details related to embodiments of the laminate plate for a rotor of an IPM electric machine that is described with reference to FIG. 3, in accordance with the disclosure.

Referring now to FIGS. 3B and 3C, with continued reference to the IPM electric machine 110 of FIG. 1, an expanded view of a portion of the laminate plate 210 is shown, including the corner portion 240 and the load bearing portion 245 that define a portion of the first elongated aperture 230. The corner portion 240 has an edge 241 that defines a void area 244 that is recessed into the first side 231 of the laminate plate 210. The edge 241 has a convex portion 242 that is arranged in series with a concave portion 243, with the convex portion 242 being connected to the first side 231 and the concave portion 243 being connected to the load bearing portion 245 of the second end 234. As illustrated with reference to FIG. 3C, the edge of the corner portion 240 includes the convex portion 242 having a first axis of rotation with a first radius R1 and the concave portion 243 having a second axis of rotation with a second radius R2, wherein the first radius R1 is less than 2 mm, and wherein the second radius R2 is greater than 0.05 mm. Furthermore, a first line L1 is defined by the first side 231, and a second line L2 is defined as being parallel to the first line L1 and at a depth d1 that is recessed into the first side 231 of the laminate plate 210. Depth d1 is greater than 0.0, but is less than 2 mm. The first radius R1, the second radius R2, and the depth d1 are designed to minimize a stress concentration in the corner portion 240 that is induced by centrifugal force of an element that is disposed in the elongated aperture 230 during rotation. Example data indicating stress concentrations in an embodiment of a corner portion of an aperture of a laminate plate is illustrated with reference to FIG. 5. In one embodiment, the element is a portion of permanent magnet 218, which is disposed in cavity 220 that is formed by alignment of the plurality of elongated apertures 230 in the plurality of the laminate plates 210 that are assembled into laminate stack 200 as part of rotor 114 that rotates in IPM electric machine 110.

Figure 3D:
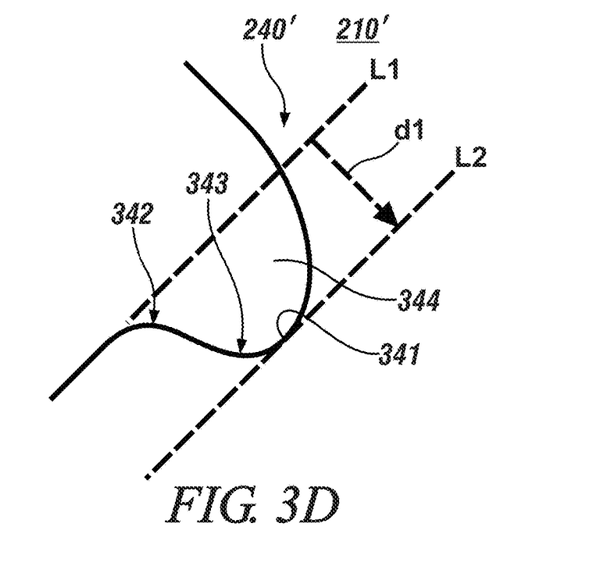

Referring now to FIGS. 3B and 3D, with continued reference to the IPM electric machine 110 of FIG. 1, an expanded view of a portion of another embodiment of the laminate plate 210' is shown, including the corner portion 240' and the load bearing portion 245 that define a portion of the first elongated aperture 230'. The corner portion 240' has an edge 341 that defines a void area 344 that is recessed into the first side 231 of the laminate plate 210. The edge 341 has a convex portion 342 that is arranged in series with a concave portion 343, with the convex portion 342 being connected to the first side 231 and the concave portion 343 being connected to the load bearing portion 245 of the second end 234. As illustrated with reference to FIG. 3D, the edge 341 of the corner portion 240 includes the convex portion 342 and the concave portion 343 being a complex spline curve having maximum depth into the plate that is less than 2 mm, wherein the maximum depth is measured by first line L1 defined by the first side 231, and second line L2 that is parallel to the first line L1 and at a depth d1 that is recessed into the first side 231 of the laminate plate 210. Depth d1 is greater than 0.0, but is less than 2 mm. The complex spline curve of edge 341 is designed to minimize a stress concentration in the corner portion 240 that is induced by centrifugal force of an element that is disposed in the elongated aperture 230' during rotation. Example data indicating stress concentration in an embodiment of a corner portion of an aperture of a laminate plate is illustrated with reference to FIG. 5. In one embodiment, the element is a portion of permanent magnet 218, which is disposed in a cavity 220 that is formed by alignment of a plurality of elongated apertures 230 in a plurality of the laminate plates 210 that are assembled into rotor stack 200 as part of rotor 114. As appreciated, a spline curve is a piecewise polynomial curve that is generated employing curve fitting and interactive curve design. As employed in design of the edge 341 of the corner portion 240, the complex spline curve of edge 341 may be generated by inducing a force, e.g., centrifugal force, on the load bearing portion 245 and iteratively selecting and testing, in a piecewise manner, curve segments that minimize stress in the corner portion 240 employing computer-aided engineering methods.

Figure 4:
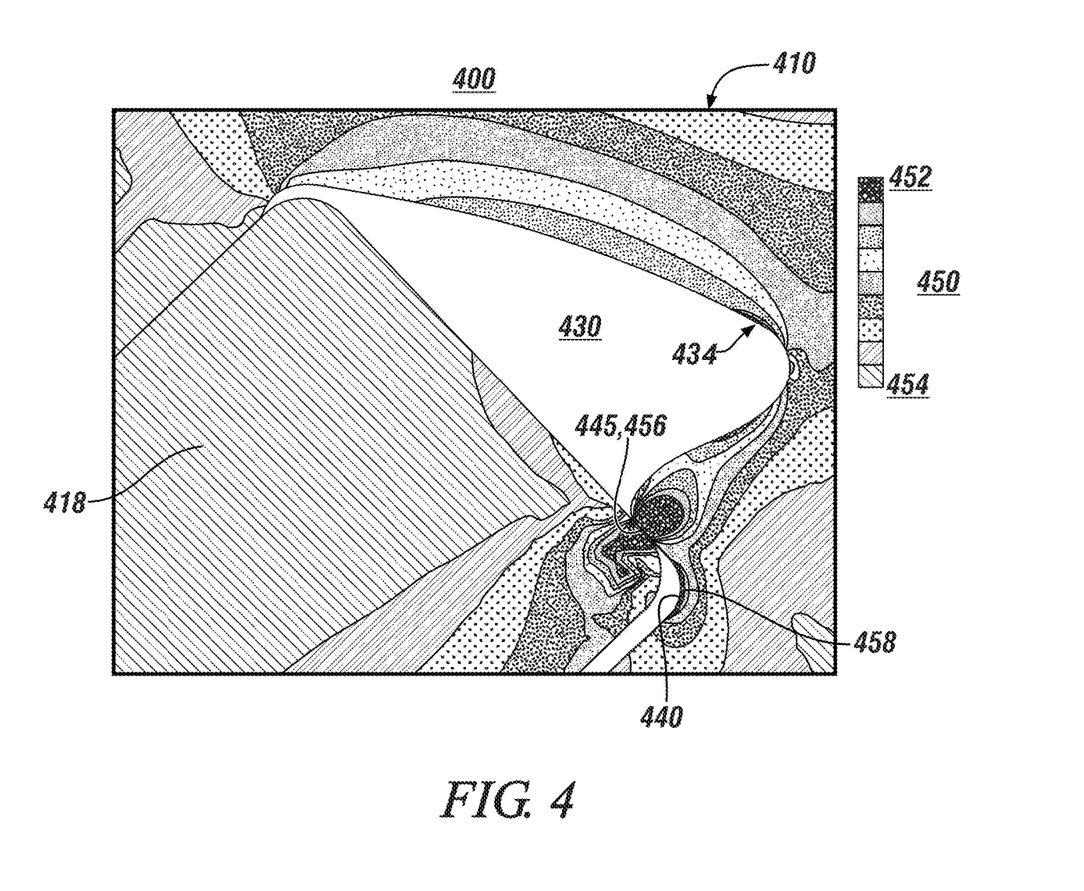
FIG. 4 schematically illustrates an end-view of a portion of a known embodiment of a laminate plate for a rotor of an IPM electric machine, including a magnitude of induced stress superimposed thereon, in accordance with the disclosure.

FIG. 4 schematically illustrates a computer-aided engineering (CAE) diagram 400 of a portion of an embodiment of a known laminate plate 410 of a rotor for an IPM electric machine, including a second end 434 of an elongated aperture 430 with a known 90 degree fillet corner portion 440 and load bearing portion 445. A permanent magnet 418 is also shown. The CAE diagram 400 shows magnitudes of stress on the laminate 410 that is induced by rotation of the rotor in a stator of the IPM electric machine. Relative magnitudes of stress 450 are depicted, ranging between a maximum stress level 452 and a minimum stress level 454. A first stress concentration 456 occurs at a point of contact between the load bearing portion 445 and the permanent magnet 418. Furthermore, a second stress concentration 458 occurs in the fillet corner portion 440. The first and second stress concentrations 456, 458 are at the maximum stress level 452.

Figure 5:
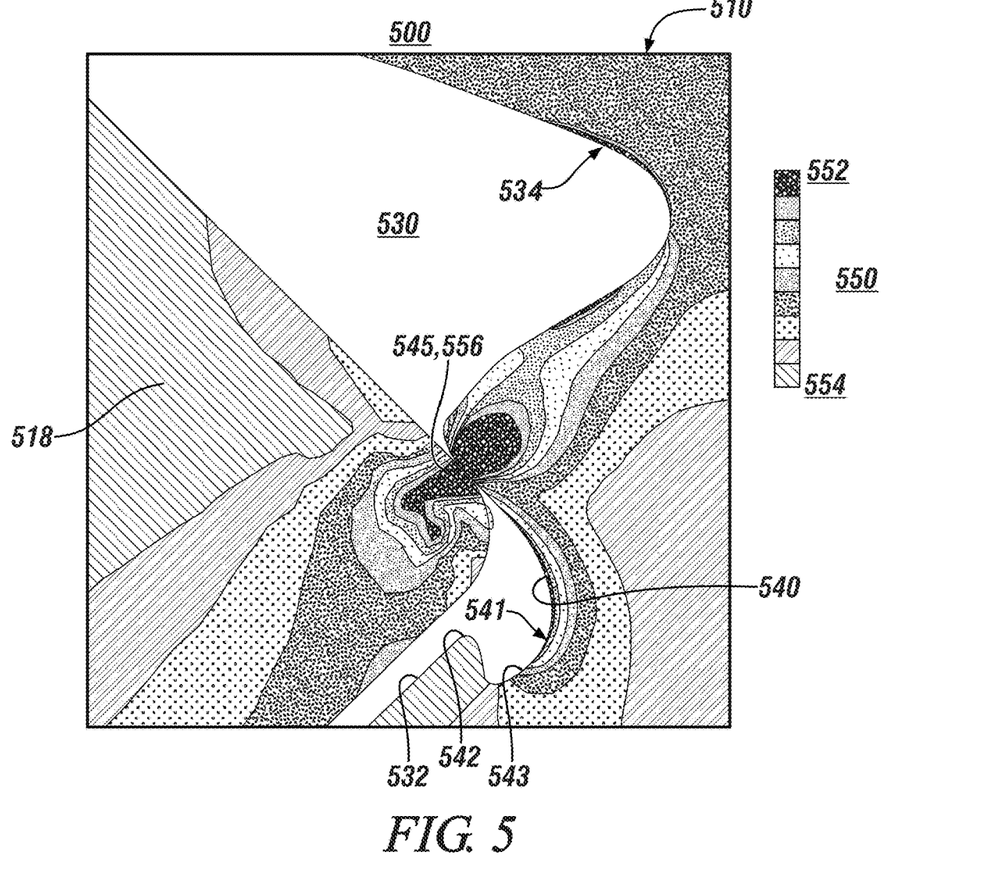
FIG. 5 schematically illustrates an end-view of a portion of an embodiment of a laminate plate for a rotor of an embodiment of the IPM electric machine described herein, including a magnitude of induced stress superimposed thereon, in accordance with the disclosure.

FIG. 5 schematically illustrates a computer-aided engineering (CAE) diagram 500 of a portion of an embodiment of a laminate plate 510 of a rotor for an IPM electric machine that has been designed in accordance with the concepts described with reference to FIGS. 3A-3D. This includes a second end 534 of an elongated aperture 530 with a corner portion 540 and load bearing portion 545, wherein the corner portion 540 includes an embodiment of edge 541 with a convex portion 542 that is arranged in series with a concave portion 543, with the convex portion 542 being connected to the first side 532 and the concave portion 543 being connected to the load bearing portion 545 of the second end 534. The edge 541 is arranged as a complex spline curve. A permanent magnet 518 is also shown. The CAE diagram 500 shows magnitudes of stress on the laminate plate 510 that is induced by rotation of the rotor in a stator of the IPM electric machine. Relative magnitudes of stress 550 are depicted, ranging between a maximum stress 552 and a minimum stress 554. A first stress concentration 556 occurs at a point of contact between the load bearing portion 545 and the permanent magnet 518, and is the only substantial stress concentration.

Figure 6:
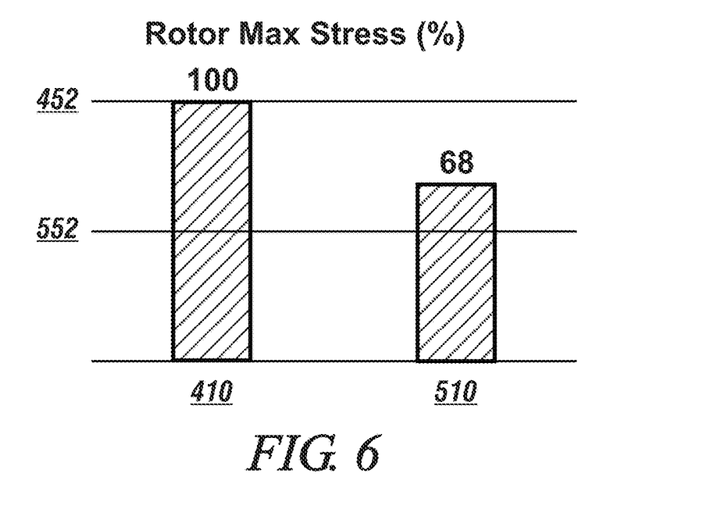
FIG. 6 graphically illustrates maximum rotor stress for a known system and an embodiment of the rotor of the IPM electric machine described herein, in accordance with the disclosure.

FIG. 6 graphically illustrates maximum stress level 452 for the embodiment of the laminate plate 510 and rotor described with reference to FIG. 5 in relation to the maximum stress level 452 for the known laminate plate 410 and rotor described with reference to FIG. 4. The results of FIG. 6 indicate a substantial reduction in the magnitude of the maximum rotor stress by employing the laminate plate 510, as compared to the known laminate plate 410. In one embodiment, the laminate plate 510 and rotor has a reduction of 32% in the maximum rotor stress as compared to the known laminate plate 410 and rotor.

The concepts described herein provide a novel corner geometry that removes material beneath the corner that is away from the magnet. This creates larger surface area that distributes stress and adds dimensional clearance for ease of manufacturing and assembly.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A laminate plate for a rotor of an interior permanent magnet (IPM) electric machine, comprising:
a disk-shaped plate defining a plurality of elongated apertures;
wherein each of the elongated apertures has a first side and a second side forming opposed first and second sides, and a first end and a second end forming opposed first and second ends;
wherein the first end is disposed towards an axis of rotation of the disk-shaped plate, and wherein the second end is disposed towards an outer periphery of the disk-shaped plate;
wherein the second end includes a corner portion and a load bearing portion;
wherein the load bearing portion is arranged perpendicular to the first side;
wherein the corner portion has an edge that defines a void area that is recessed into the first side;
wherein the edge includes a convex portion having a first radius R1 arranged in series with a concave portion having a second radius R2, and wherein the first radius R1 is greater than the second radius R2;
wherein the convex portion is connected to the first side;
wherein the concave portion is connected to the load bearing portion of the second end; and
wherein the edge minimizes a stress concentration in the corner portion that is induced by centrifugal force when the rotor is rotating in the IPM electric machine.

2. The laminate plate of claim 1, wherein the edge of the corner portion comprises the convex portion having a first radius R1 and the concave portion having a second radius R2; and wherein the first radius R1 is less than 2 mm, and wherein the second radius R2 is greater than 0.05 mm.

3. The laminate plate of claim 1, wherein the edge of the corner portion comprises the convex portion and the concave portion being a complex spline curve having maximum depth into the disk-shaped plate that is less than 2 mm.

4. The laminate plate of claim 1, wherein the edge minimizes the stress concentration in the corner portion that is induced by centrifugal force of an element that is disposed in the aperture when the rotor is rotating in the IPM electric machine, and wherein the element is arranged to act upon the load bearing portion.

5. The laminate plate of claim 1, wherein the laminate plate is fabricated from electrical steel.

6. The laminate plate of claim 1, wherein the plurality of elongated apertures are circumferentially arranged.

7. A rotor for an interior permanent magnet (IPM) electric machine, the rotor comprising:
a rotatable shaft, disposed on a longitudinal axis;
a plurality of disk-shaped plates arranged on the rotatable shaft; and
a plurality of permanent magnets;
wherein each of the plurality of disk-shaped plates defines a plurality of apertures;
wherein the plurality of disk-shaped plates are arranged with the plurality of apertures being aligned to form a plurality of axially-disposed cavities;
wherein the plurality of permanent magnets are disposed in the plurality of axially-disposed cavities;
wherein each of the plurality of apertures of each of the plurality of disk-shaped plates has a first side and a second side forming opposed first and second sides, and a first end and a second end forming opposed first and second ends;
wherein the first end is disposed towards the longitudinal axis, and wherein the second end is disposed towards an outer periphery of the disk-shaped plate;
wherein the second end includes a corner portion and a load bearing portion;
wherein the load bearing portion is arranged perpendicular to the first side;
wherein the corner portion has an edge that defines a void area that is recessed into the first side;
wherein the edge includes a convex portion having a first radius R1 arranged in series with a concave portion having a second radius R2, and wherein the first radius R1 is greater than the second radius R2;
wherein the convex portion is connected to the first side;
wherein the concave portion is connected to the load bearing portion of the second end; and
wherein the edge minimizes a stress concentration in the corner portion that is induced by centrifugal force when the rotor is rotating.

8. The rotor of claim 7, wherein the edge of the corner portion comprises the convex portion having a first radius R1 and the concave portion having a second radius R2; wherein the first radius R1 is less than 2 mm, and wherein the second radius R2 is greater than 0.05 mm.

9. The rotor of claim 7, wherein the edge of the corner portion comprises the convex portion and the concave portion being a complex spline curve having maximum depth into the disk-shaped plate that is less than 2 mm.

10. The rotor of claim 7, wherein the edge minimizes the stress concentration in the corner portion that is induced by centrifugal force when the rotor is rotating in the IPM electric machine, and wherein the permanent magnet is arranged to act upon the load bearing portion.

11. The rotor of claim 7, wherein the disk-shaped plate is fabricated from electrical steel.

12. The rotor of claim 7, wherein the plurality of apertures are circumferentially arranged.

13. An interior permanent magnet (IPM) electric machine, comprising:
a rotor rotatably arranged within a stator;
the rotor comprising:
a rotatable shaft, disposed on a longitudinal axis;
a plurality of laminate plates arranged on the rotatable shaft; and
a plurality of permanent magnets;
wherein each of the plurality of laminate plates defines a plurality of circumferentially arranged apertures;
wherein the plurality of laminate plates are arranged with the plurality of circumferentially arranged apertures being aligned to form a plurality of axially-disposed cavities;
wherein the plurality of permanent magnets are disposed in the plurality of axially-disposed cavities;
wherein each of the apertures of the plurality of laminate plates has a first side and a second side forming opposed first and second sides, and a first end and a second end forming opposed first and second ends;
wherein the first end is disposed towards an axis of rotation of the plurality of laminate plates;
wherein the second end is disposed towards an outer periphery of the plurality of laminate plates;
wherein the second end includes a corner portion and a load bearing portion;

wherein the corner portion has an edge that defines a void area that is recessed into the first side;

wherein the edge includes a convex portion having a first radius R1 arranged in series with a concave portion having a second radius R2, and wherein the first radius R1 is greater than the second radius R2;

wherein the convex portion is connected to the first side;

wherein the concave portion is connected to the load bearing portion of the second end; and wherein the edge minimizes a stress concentration in the corner portion that is induced by centrifugal force when the rotor is rotating in the stator.

14. The IPM electric machine of claim 13, wherein the edge of the corner portion comprises the convex portion having a first radius R1 and the concave portion having a second radius R2; wherein the first radius R1 is less than 2 mm, and wherein the second radius R2 is greater than 0.05 mm.

15. The IPM electric machine of claim 13, wherein the edge of the corner portion comprises the convex portion and the concave portion being a complex spline curve having maximum depth into the plate that is less than 2 mm.

16. The IPM electric machine of claim 13, wherein the edge minimizes the stress concentration in the corner portion that is induced by centrifugal force when the rotor is rotating in the stator, and wherein the one of the plurality of permanent magnets is arranged to act upon the load bearing portion.

17. The IPM electric machine of claim 13, wherein the load bearing portion is arranged perpendicular to the first side.

* * * * *